US011438550B1

(12) United States Patent
Gersht et al.

(10) Patent No.: US 11,438,550 B1
(45) Date of Patent: Sep. 6, 2022

(54) VIDEO CONFERENCE CONTENT REQUESTS TO NON-PARTICIPANTS

(71) Applicant: RED HAT, INC., Raleigh, NC (US)

(72) Inventors: Ilan Gersht, Bat Yam (IL); Arie Bregman, Gan Yavne (IL); Avraham Talmor, Rishon Letzion (IL)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 17/240,184

(22) Filed: Apr. 26, 2021

(51) Int. Cl.
*H04N 7/15* (2006.01)
(52) U.S. Cl.
CPC ................... *H04N 7/155* (2013.01)
(58) Field of Classification Search
USPC ...................................................... 348/14.08
See application file for complete search history.

(56) References Cited

U.S. PATENT DOCUMENTS

| | | | |
|---|---|---|---|
| 9,578,073 B2* | 2/2017 | Bader-Natal | G06F 3/04817 |
| 10,331,303 B1* | 6/2019 | Gurtin | G06F 9/451 |
| 10,771,270 B2 | 9/2020 | Sullivan | |
| 2006/0075055 A1 | 4/2006 | Littlefield | |
| 2013/0069969 A1* | 3/2013 | Chang | H04L 51/04 |
| | | | 345/589 |
| 2015/0221147 A1* | 8/2015 | Daniel-Wayman | G07C 9/21 |
| | | | 340/5.54 |
| 2018/0097754 A1* | 4/2018 | Jiang | G06Q 30/0643 |

FOREIGN PATENT DOCUMENTS

| | | |
|---|---|---|
| CN | 101841422 B | 9/2010 |
| WO | 2006063162 A2 | 6/2006 |

OTHER PUBLICATIONS

Google, "Chatting With External Users", 2020, 1 page https://support.google.com/a/answer/9296706?hl=en.
Nextcloud GMBH, "Nextcloud Talk", 2020, 11 pages https://nextcloud.com/talk/.
3CX, "Connecting Customers & Co-Workers", 2020, 10 pages https://www.3cx.com/user-manual/video-conferencing/.
Microsoft, "Call and Chat with Users from Other Organizations in Microsoft Teams", Nov. 13, 2020, 4 pages https://docs.microsoft.com/en-us/microsoftteams/communicate-with-users-from-other-organizations.
Zoom, "Zoom Chat", 2020, 6 pages https://zoom.us/feature/messaging.

* cited by examiner

*Primary Examiner* — Amal S Zenati
(74) *Attorney, Agent, or Firm* — Lowenstein Sandler LLP (57) ABSTRACT

Systems and methods for providing video conference content requests to non-participants. An example method may include receiving, from a first participant of a video conference, via a first communication channel that is associated with the video conference, a content request directed to a non-participant, wherein the non-participant is not connected to the video conference; transmitting, via a second communication channel that is not associated with the video conference, the content request to the non-participant; receiving, from the non-participant, a response to the content request; and transmitting, via the first communication channel, to at least one of the first participant or a second participant of the video conference, a message reflecting the response.

20 Claims, 5 Drawing Sheets

VIDEO CONFERENCE CONTENT REQUESTS TO NON-PARTICIPANTS

TECHNICAL FIELD

The present disclosure is generally related to audio and video conferencing over a network, and more particularly, to providing video conference content requests to non-participants.

BACKGROUND

Conference calls, such as video conferences, allow multiple participants to communicate simultaneously from multiple remote locations. The number of participants on a conference call can range from two to dozens or hundreds. Conference calls may be arranged in such a way that participants on the conference call connect to a service, which combines their audio and/or video and routes it back to the participants.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for providing video conference content requests to non-participants.

Videotelephony includes technology that enables for the reception and transmission of audio-video signals by users in different locations, for communication between people in real time. Using videotelephony, individuals may perform video conferencing, which may use this technology for a group or organizational meeting in a video conference. Video conferencing is commonly used in commercial and corporate settings to facilitate meetings and conferences between parties that already have established relationships. Many current videotelephony technologies may use the Internet rather than the traditional landline phone network.

Current systems do not enable participants of a video conference to communicate with non-participants. For example, a participant of an active video conference may raise a question or an issue that requires consultation from a party, which may not be connected to the video conference. As such, the participant may contact the non-participating party ("non-participant") using a separate communication application, such as email or an online messaging service. However, that communication application would not directly feed the non-participant's response into the video conference. Further, the participant would need monitor the communication application while waiting for a response from the non-participant. Alternatively, the participants may invite the non-participant into the video conference. However, the non-participant may be otherwise occupied or unable to join. Further, in some instances, the non-participant may be unable to join due to, for example, security reasons. Thus, systems and methods capable of enabling participants of a video conference to communicate with non-participants are desirable.

Aspects of the present disclosure address the above-noted and other deficiencies by providing technology that enables a video conference participant to send a content request to a non-participant, and display the response to the content request to the participants of the video conference. In some embodiments, a video conference platform may initiate a video conference. The video conference may include multiple participants. For example, a client device of each participant may include a video conference application. The video conference platform may arrange the video conference in such a way that connects client devices, via the video conference application, to the video conference platform.

In some embodiments, during the video conference, the video conference application may receive, from one of the participants, a content request to send to a non-participant of the video conference. The non-participant may be an external party not invited to access the video conference. The content request may include, for example, a query, a statement, a poll, a multiple choice question(s), an audio file, etc. The video conference application may also receive an input specifying destination information of the non-participant. The destination information may be related to a communication service, such as an email service, a web-based messaging service, or a telephone based messaging service. For example, the content request may specify an email address, a phone number (for a text message), or a unique identifier, (e.g., IP addresses, server names and/or identifiers, channel names and/or identifiers, etc.) of the non-participant.

In some embodiments, the video conference application may first send the content request to the video conference platform, which may then route the content request, via the communication service server, to the non-participant based on the destination information. The non-participant may receive the content request from the communication service. For example, an email message may be sent to the non-participant's email address, a text message may be sent to the non-participant's phone number, a direct message may be sent to the non-participant's web-based messaging service, a voice message may be sent to a voice-over-IP (VoW) service, etc. Responsive to the non-participant submitting their response (e.g., replying via email, via text message, via direct message, etc.), the video conference platform may display the response to the content request on the video conference application interface. For example, the video conference platform may generate a "popup" window on the video conference application interface displaying the response, generate a selectable button to open the response to the content request, etc. The response may be displayed to each participant of the video conference, or to a predetermined set of the participants. In some embodiments, the response may be a text message or a text file. In some embodiments, the response may be an audio file that may be converted into a text file and displayed in the video conference, or fed into the audio channel to be listened to by the participants of the video conference. In some embodiments, the response may be a graphics file (e.g., a sequence of one or more images or video frames, such as a Graphics Interchange Format (GIF) file) a video, etc. As such, one or more participants of the video conference are provided with a response, from the non-participant, to their content request.

In some embodiments, the video conference application may send the content request to the non-participant directly via the communication service server (e.g., not through the video conference platform). The non-participant may receive the content request from the communication service server, and submit a response to the content request. Responsive to the non-participant submitting their response, the video conference application (rather than the video conference platform) may receive the response, and feed the response into the video conference as video and/or audio data. Accordingly, the remaining participants of the video conference may receive the response via the video conference platform. For example, the video conference application may insert the audio and/or video data of the response into an audio and/or video channel, respectively, of the conference call. As such, the response may be sent to the video conference platform, and then forwarded to one or more of the remaining participants of the conference call. This may enable the identity and/or location of the non-participant to be hidden from the video conference platform.

In some embodiments, the video conference platform and/or the video conference application may open and/or maintain a communication channel with the non-participant. The communication channel may be used for follow-up content requests. For example, responsive to the response to the content request being a response to a question, one or more participants of the video conference may enter a follow-up question in, for example, the popup window. As such, the video conference platform and/or the video conference application may enable the participants of the video conference to actively communicate with the non-participant.

Various aspects of the above referenced methods and systems are described in details herein below by way of examples, rather than by way of limitation.

Figure 1:
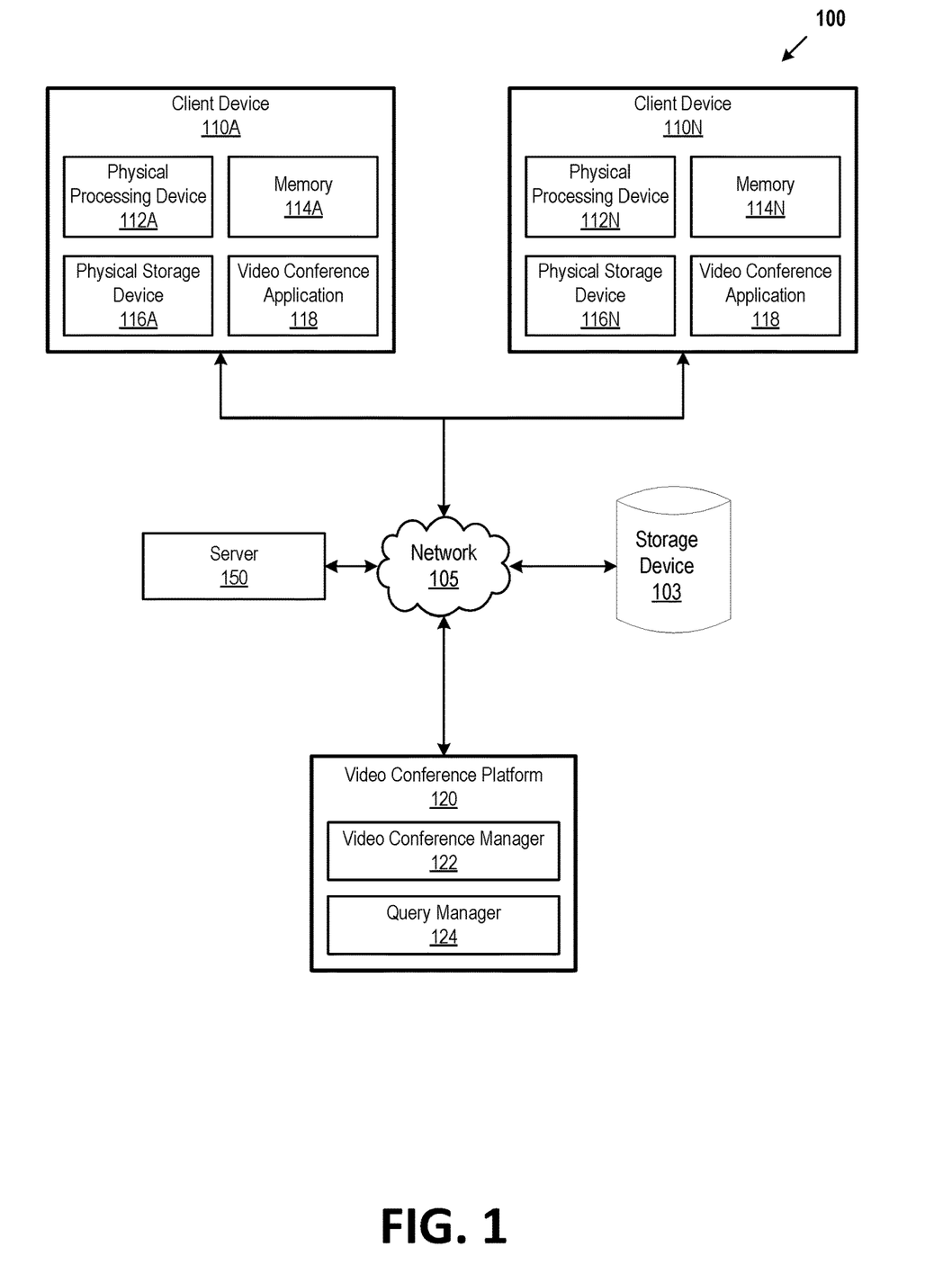
FIG. 1 depicts a high-level block diagram of a system architecture for providing video conference content requests to non-participants, in accordance with one or more aspects of the present disclosure.

FIG. 1 is a diagram of one embodiment of a system architecture for providing video conference content requests to non-participants, in accordance with one or more aspects of the present disclosure. The distributed computer system 100 may include client devices 110A-110N, video conference platform 120, server 150, and storage device 103 communicably connected over a network 105. The network 105 may be a private network (e.g., a local area network (LAN), a wide area network (WAN), intranet, etc.) or a public network (e.g., the Internet).

The client devices 110A-110N may be a server, a workstation, a personal computer (PC), a mobile phone, a smart phone, a mobile computing device, a personal digital assistant (PDA), tablet, laptop computer, thin client, etc. The client devices 110A-110N may include one or more physical processing devices 112A-112N, memory 114A-114N, and physical storage devices 116A-116N (e.g., a data storage device or mass storage device, such as a magnetic or optical storage based disk, tape or hard drive). Client devices 110-110N may also include one or more peripheral devices (not pictured), which may include network devices, graphics devices, system components (e.g., bridges, ports, buses) media devices, (e.g., video cards, sounds cards, etc.).

Client devices 110A-110N may include a video conference application 118. Video conference application 118 may be a browser-based application, an application residing on the client device 110A-N, or any combination thereof. Video conference application 118 may be implemented by one or more processes running on client device 110A-N and may provide access to video conference services provided by video conference platform 120.

Video conference platform 120 may be software or hardware capable of arranging video conferences in such a way that connects client device 110A-N to video conference platform 120. Video conference platform 120 may include video conference manager 122 and query manager 124. Video conference manager 122 may manage video conferences in accordance with one or more aspects of the present disclosure. A video conference is designed to allow multiple participants to listen and/or speak on the call. The video conference may be, for example, a video conference call or a telephonic conference call. Video conference manager 122 manager may combine the audio and/or video received from client device 110A-N and route the audio and/or video back to client device 110A-N.

Video conference manager 122 may be assigned a telephone number, a web address (e.g., Hypertext Transfer Protocol (HTTP)), an Internet Protocol (IP) address, etc. Video conference manager 122 may enable the participants on client device 110A-N, at the same and/or diverse locations, to be connected to the video conference. In an example, video conference manager 122 allows participants to dial into a virtual meeting room using video conference application 118 and/or other applications of client device 110A-N.

Query manager 124 may send queries from participants of the video conference to one or more non-participants via server 130. In some embodiments, query manager 124 may receive, from device 110A-N, a content request to send to a non-participant of the video conference. The content request may include, for example, a query, a statement, a survey, a poll, a multiple choice question(s), an audio file, etc. In some embodiments, the participant may select a button using video conference application 118 to generate the content request. Selection of the button may cause the conference application 118 display a window requesting one or more inputs. For example, the window may request the participant to select a type of content message (e.g., free text message, survey, poll, etc.), to enter a corresponding inquiry (enter the message, set parameters of the survey or poll, etc.), and to select one or more recipients to receive the content request. In some embodiments, the recipients are non-participants of the video conference.

In some embodiments, video conference application 118 may store a data structure containing one or more recipients. The data structure may store the names of the recipients, unique nicknames (e.g., usernames), email addresses, phones numbers, or unique identifiers, such as IP addresses, server names and/or addresses, channel names and/or address, application names and/or addresses, etc. In an example, video conference application 118 may generate an address book sorted by names, receive a user input selecting a name in the address book, and populate an email address into an email header. In some embodiments, the data structure may be associated with a participant and imported into the video conference platform 118. For example, the participant may import the data structure from a third party software. In some embodiments, data structure a component of the video conference application, and may be populated by the participant.

Once the participant is finished preparing the content request, the participant may select a button, on the interface of the video conference application, to send the content request to the intended recipient. In some embodiments, the data structure may be stored on physical storage devices 116A-N. In some embodiments, the data structure may be stored on storage device 103.

In some embodiments, the query manager 124 may receive the content request from video conference application 118 and route the content request to the intended recipient. In some embodiments, query manager 124 may route the content request to server 150. In some embodiments, video conference application 118 may directly send the content request to the indented recipient (e.g., to server 150). Accordingly, video conference application may bypass the video conference platform.

Server 150 may be one or more computing devices (such as a server, a workstation, a personal computer (PC), a mobile phone, a smart phone, a mobile computing device, a personal digital assistant (PDA), tablet, laptop computer, thin client.) storage devices (e.g., hard disks, databases), networks, software components, or hardware components that may be used to provide email services, messaging services (e.g., text message), voice services, etc. Server 150 may include a website (e.g., a webpage), an interface, an application, or any other software capable of providing a user with access to the content request.

In some embodiments, query manager 124 may receive a response to the content request from server 150. For example, a user may receive the content request via email, input a response to the content request, and send the response to the content request to the participant. Query manager 124 may receive the response to the content request, and transmit the content request to video conference application 118 of one or more user device 110A-N.

In some embodiments, the client device that sent the content request to the intended recipient may receive, via video conference application 118, the response to the content request directly from server 150. The video conference application 118 may then enter the response as video data, audio data, or a combination thereof into the conference call (via, for example, an audio channel and/or a video channel. Accordingly, the response may then be sent, via the video conference platform 120, to one or more other participants of the conference call.

In some embodiments, the response to the content request may be displayed to all of the participants of the video conference. For example, the video conference application 118 may generate a popup window, a widget, a selectable button to open the response to the content request, of any other element capable of displaying the response. In some embodiments, the response may be a text message or a text file. In some embodiments, the response may be an audio file that may be converted into a text file and displayed in the video conference, or fed into the audio channel to be listened to by the participants of the video conference. In some embodiments, the response may be a graphics file (e.g., a sequence of one or more images or video frames, such as a Graphics Interchange Format (GIF) file) a video, etc. As such, one or more participants of the video conference are provided with a response, from the non-participant, to their content request In some embodiments, one or more participants of the video conference may input a follow-up content request. For example, responsive to the response to the content request being a response to a question, one or more participants of the video conference may enter a follow-up question in the popup window. The follow-up question may, following one or more procedures of the present disclosure, be sent to the user by query manager 124.

In some embodiments, the response to the content request may be displayed to a predetermined set of participants of the video conference. For example, when configuring the content request, a participant may select which participants of the video conference are to receive the response to the content request. Accordingly, responsive to query manager 124 and/or video conference application 118 receiving the response to the content request, query manager 124 and/or video conference application 118 may send the response to the content request only to the participants authorized to receive the response. In some embodiments, the response to the content request may be displayed to only the participant that generated the content request.

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid state drives (SSD)), other data storage devices, or a combination thereof. In yet another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels. In some embodiments, storage device may store data associated with video conference application 118, video conference platform 120, and/or server 150.

Physical processing devices 112A-N may include one or more processors that are capable of executing the computing tasks. Physical processing devices 112A-N may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 112A-N may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Physical storage devices 116A-N may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 116A-N may be physical memory and may include volatile memory devices (e.g., random access memory (RAM)), non-volatile memory devices (e.g., flash memory, NVRAM), and/or other types of memory devices. In another example, physical storage devices 116A-N may include one or more mass storage devices, such as hard drives, solid state drives (SSD)), other data storage devices, or a combination thereof. In a further example, physical storage devices 116A-N may include a combination of one or more memory devices, one or more mass storage devices, other data storage devices, or a combination thereof, which may or may not be arranged in a cache hierarchy with multiple levels.

Network 105 may be a public network (e.g., the internet), a private network (e.g., a local area network (LAN), a wide area network (WAN)), or a combination thereof. In one example, network 105 may include a wired or a wireless infrastructure, which may be provided by one or more wireless communications systems, such as a wireless fidelity (WiFi) hotspot connected with the network 105 and/or a wireless carrier system that can be implemented using various data processing equipment, communication towers, etc.

Figure 2:
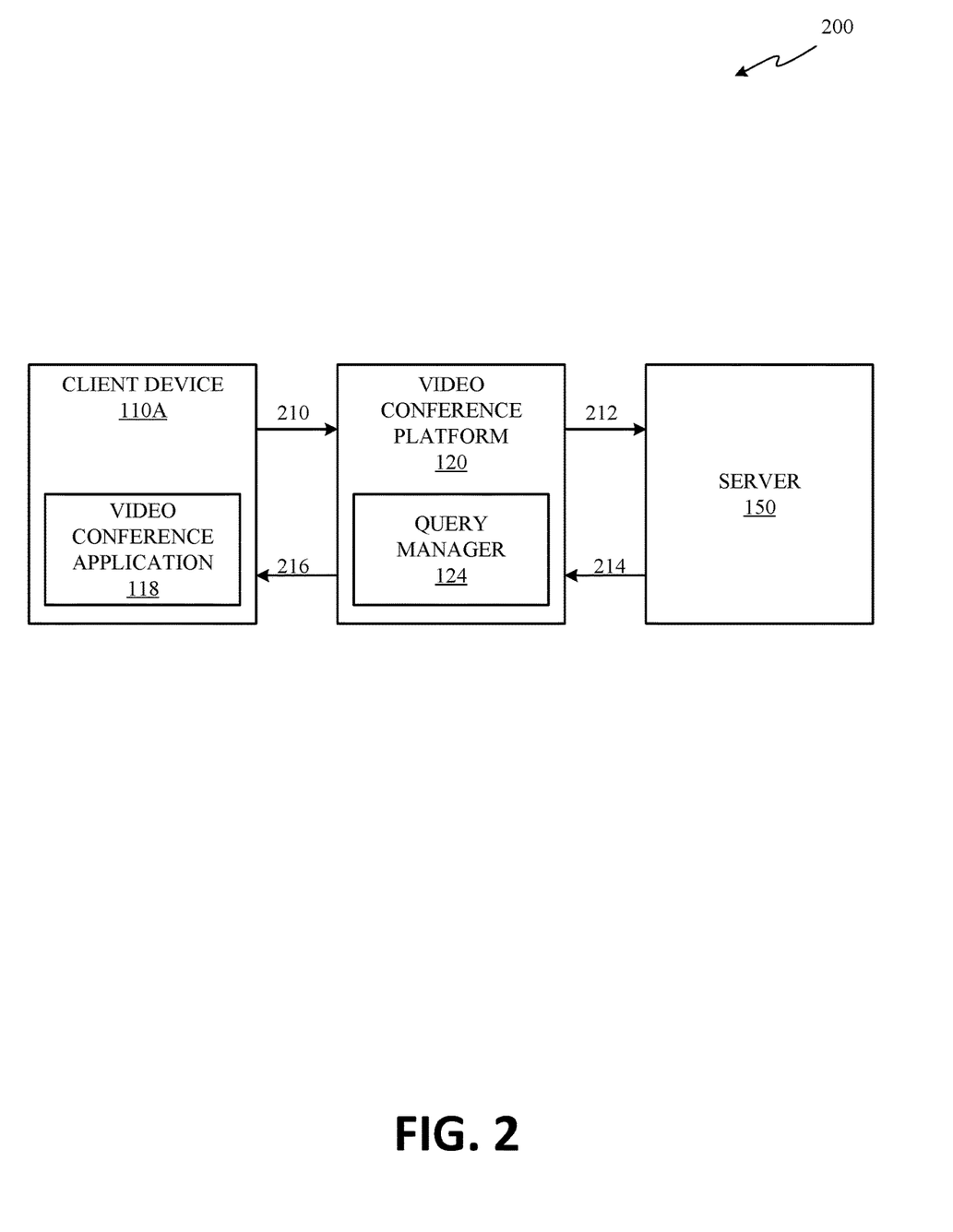
FIG. 2 depicts a block diagram of a method for providing video conference content requests to non-participants, in accordance with one or more aspects of the present disclosure.

FIG. 2 depicts a block diagram of a method 200 for providing video conference content requests to non-participants, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., client device 110A-N, video conference platform 120, and/or server 150 of FIG. 1) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At operation 210, the process can begin with receiving, by video conference platform 120, a content request directed to a non-participant. The content request may be received from a participant of a video conference via a graphical user interface of video conference application 118 executing on client device 110A-N. The request may be received via a first communication channel that is associated with the video conference. The non-participant may be a party not connected to the video conference. The content request may include, for example, a query, a free text message, a survey, a poll, a multiple choice question(s), an audio file, etc.

At operation 212, the query manager 124 may transmit, via a second communication channel, the content request to the non-participant via server 150. The second communication channel may not be associated with the video conference. Server 150 may provide a communication service, such as an email service, a web-based messaging service, or a telephone based messaging service. The query manager 124 may transmit the content request to the non-participant using identifier information, such as an email address, a phone number, an application address, an IP address, a server name and/or identifier, etc. In some embodiments, query manager 124 may transmit the content request to multiple non-participants.

At operation 214, query manager 124 may receive, from the non-participant, a response to the content request. For example, query manager 124 may receive an email, a text message, an audio file, a video file, etc., from server 150 via the second communication channel.

At operation 216, the query manager 124 may transmit, to one or more participants of the video conference, a message reflecting the response. The message may be transmitted via the first communication channel. In some embodiments, the query manager 124 may cause the message reflecting the response to be displayed on the graphical user interface of video conference application 118. For example, the message may be displayed to all of participants of the video conference, or to a set of the participants. For example, the video conference application 118 may generate a popup window, a widget, a selectable button to open the response to the content request, of any other element capable of displaying the response. In some embodiments, one or more participants of the video conference may input a follow-up content request.

Figure 3:
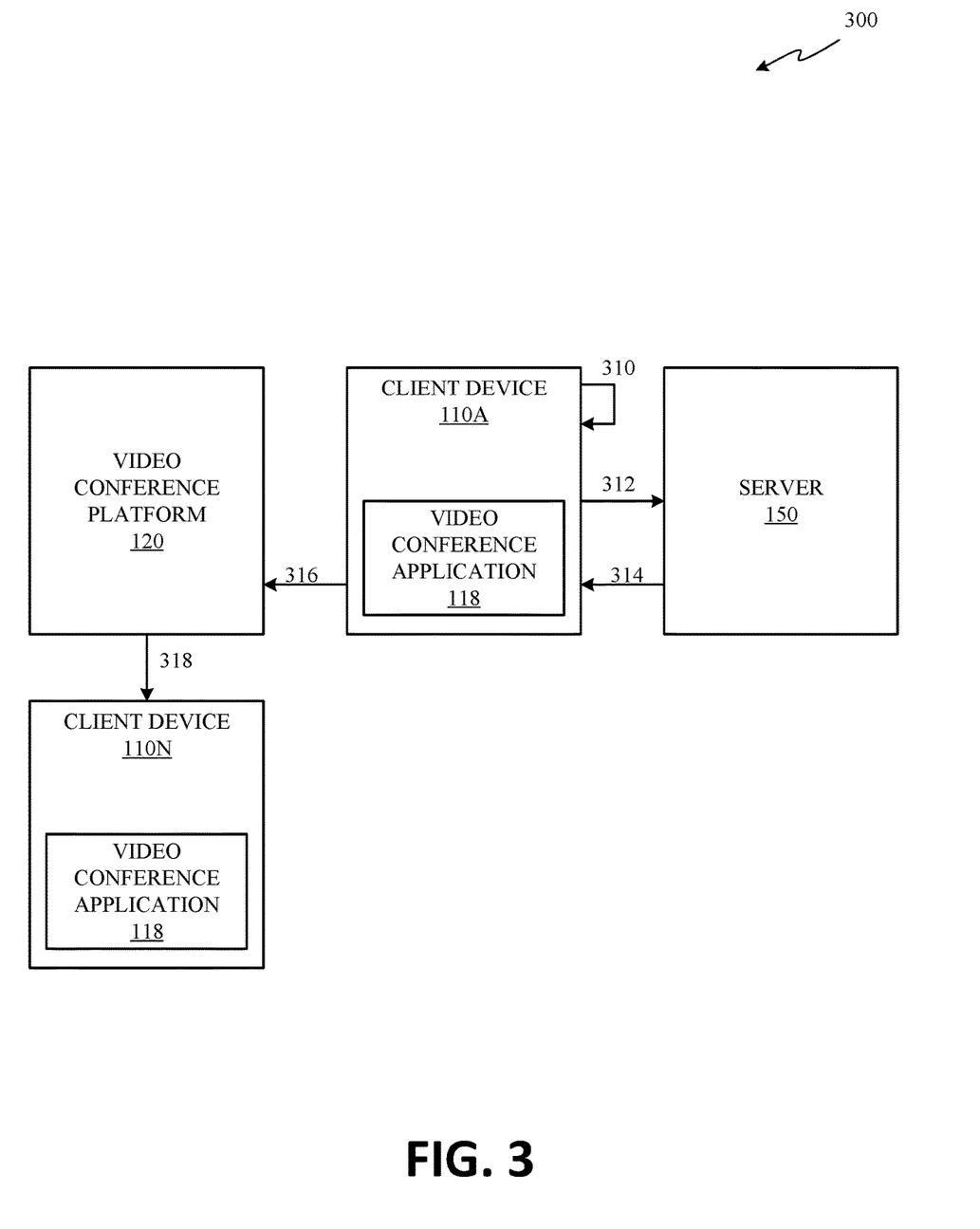
FIG. 3 depicts a block diagram of another method for providing video conference content requests to non-participants, in accordance with one or more aspects of the present disclosure.

FIG. 3 depicts a block diagram of a method 300 for providing video conference content requests to non-participants, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., client device 110A-N, video conference platform 120, and/or server 150 of FIG. 1) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms).

At operation 310, the process can begin with receiving, by video conference application 118, a content request directed to a non-participant. The content request may be received from a participant of a video conference via a graphical user interface of video conference application 118 executing on client device 110A-N. The request may be received via a first communication channel that is associated with the video conference. The non-participant may be a party not connected to the video conference. The content request may include, for example, a query, a free text message, a survey, a poll, a multiple choice question(s), an audio file, etc.

At operation 312, video conference application 118 may transmit, via a second communication channel, the content request to the non-participant via server 150. The second communication channel may not be associated with the video conference. Server 150 may provide a communication service, such as an email service, a web-based messaging service, or a telephone based messaging service. The video conference application 118 may transmit the content request to the non-participant using identifier information, such as an email address, a phone number, an application address, an IP address, a server name and/or identifier, etc. In some embodiments, video conference application 118 may transmit the content request to multiple non-participants At operation 314, video conference application 118 may receive, from the non-participant, a response to the content request. For example, video conference application 118 may receive an email, a text message, an audio file, a video file, etc., from server 150 via the second communication channel.

At operation 316, video conference application 118 may then enter the response as video data, audio data, or a combination thereof into the conference call (via, for example, an audio channel and/or a video channel). Thus, the response may be sent to video conference platform 120.

At operation 318, the video conference platform 120 may forward the response, as audio and/or video data, to one or more of the remaining participants of the conference call (e.g., client device 110N).

Figure 4:
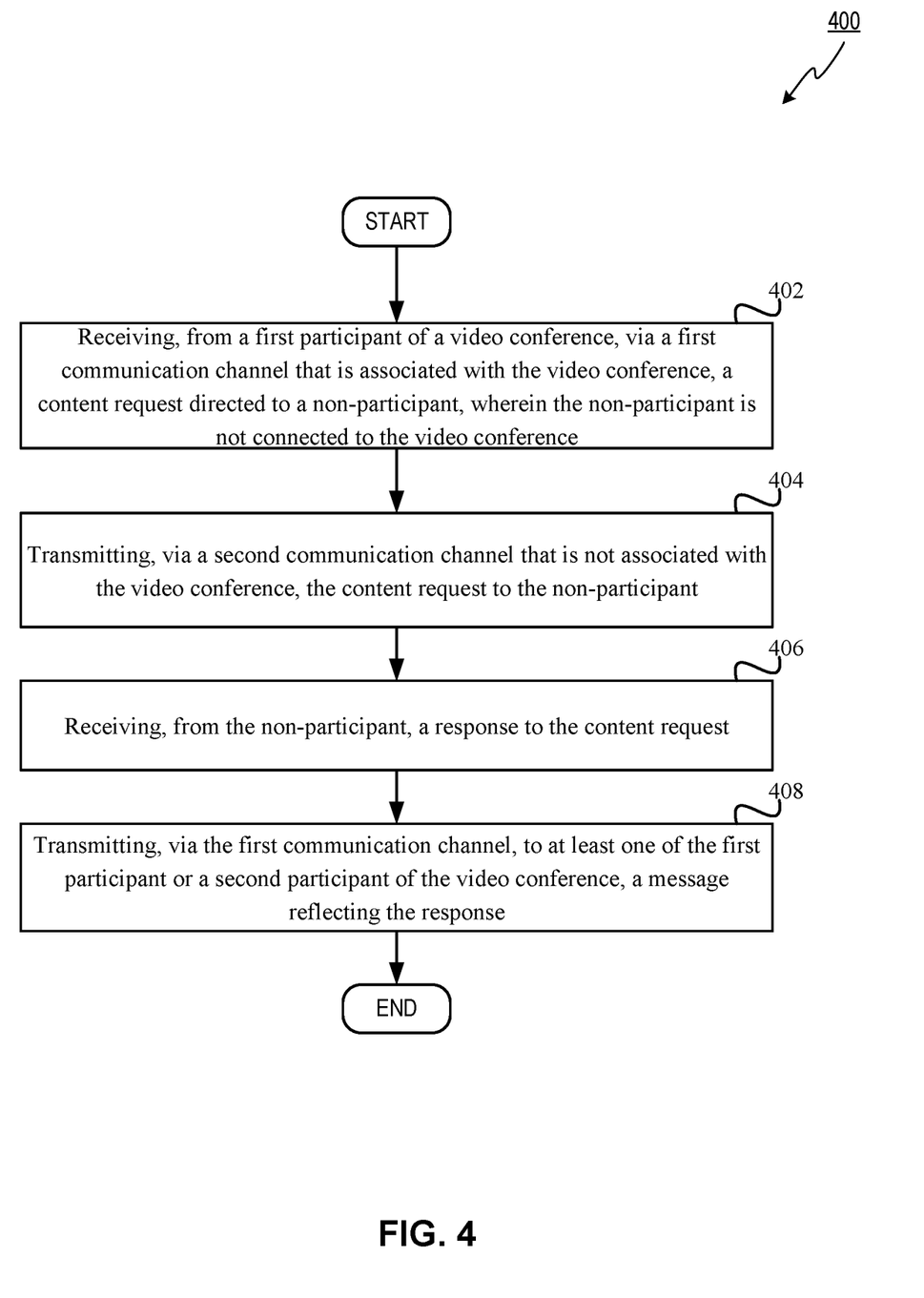
FIG. 4 depicts a flow diagram of an example method for providing video conference content requests to non-participants, in accordance with one or more aspects of the present disclosure.

FIG. 4 depicts a flow diagram of an illustrative example of a method 400 for providing video conference content requests to non-participants, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

Method 400 may be performed by processing devices of a client device or video conference platform and may begin at block 402. At block 402, the processing device receive a content request directed to a non-participant. The content request may be received from a participant of a video conference via a graphical user interface of video conference application 118 executing on client device 110A-N. The request may be received via a first communication channel that is associated with the video conference. The non-participant may be a party not connected to the video conference. The content request may include, for example, a query, a free text message, a survey, a poll, a multiple choice question(s), an audio file, etc. The content request may further include an identifier used to identify at least one of an email address, a phone number, or a unique identifier of the non-participant.

At block 404, the processing device may transmit, via a second communication channel that is not associated with the video conference, the content request to the non-participant. In some embodiments, the content request may be transmitted, by the processing device, to multiple participants.

At block 406, the processing device may receive, from the non-participant, a response to the content request.

At block 408, the processing device may transmit, via the first communication channel, to at least one of the first participant or a second participant of the video conference, a message reflecting the response. In some embodiments, the processing device may cause the message reflecting the response to be displayed, to one or more participants of the video conference, in a video conference interface. Responsive to completing the operations described herein above with references to block 408, the method may terminate.

Figure 5:
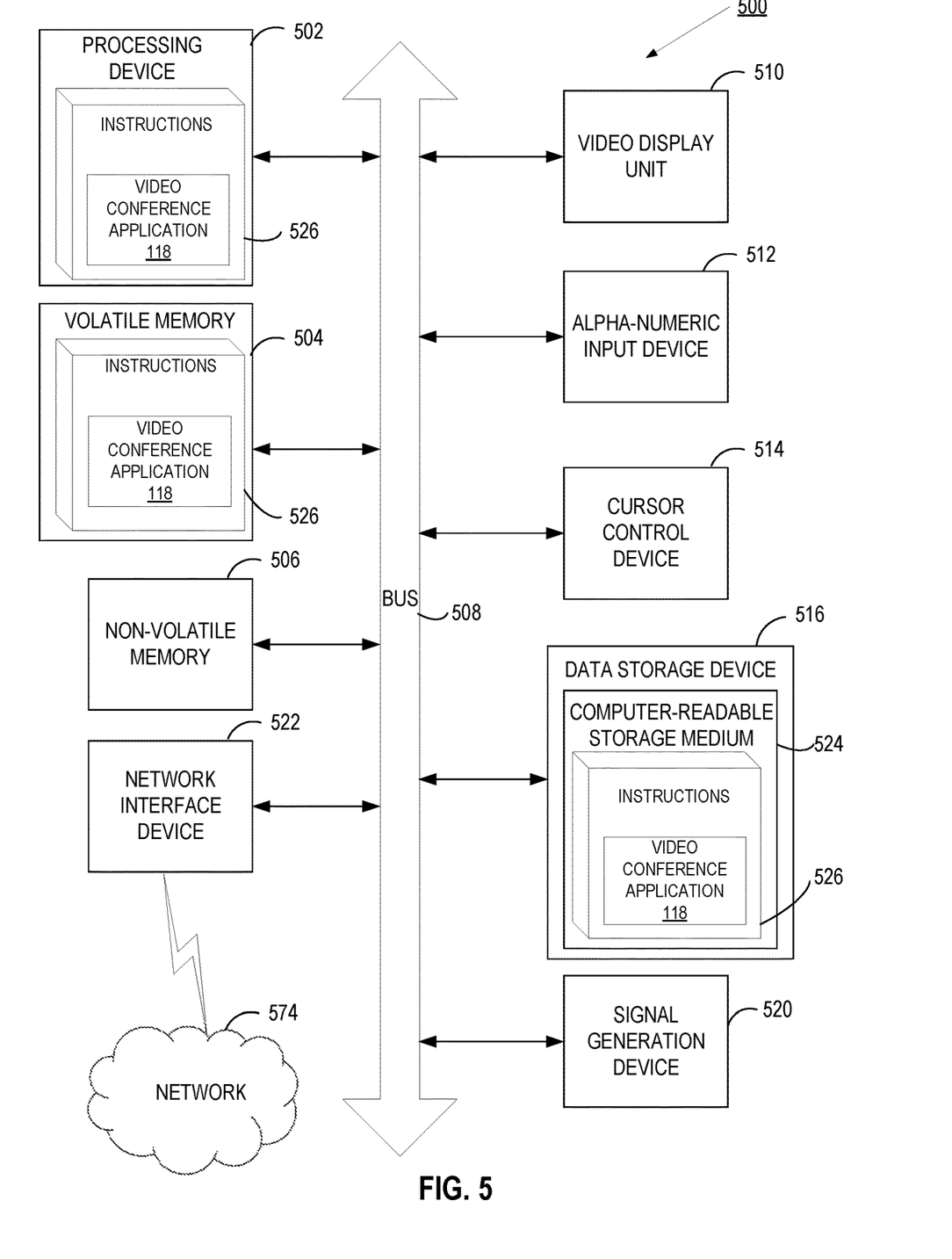
FIG. 5 depicts a block diagram of an illustrative computing device operating in accordance with the examples of the present disclosure.

FIG. 5 depicts a block diagram of a computer system operating in accordance with one or more aspects of the present disclosure. In various illustrative examples, computer system 1000 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 200, 300, or 400 and for video conference application 118, query manager 124 (not shown), and modules illustrated in FIGS. 1, 2, and 3.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300, or 400 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   presenting, by a video conference platform, a video conference on a user device of a first participant;
   receiving, by the video conference platform and from the first participant of the video conference, via a first communication channel that is associated with the video conference, a content request directed to a non-participant, wherein the non-participant is not connected to the video conference;
   receiving, by the video conference platform, destination information related to a communication service associated with the non-participant;
   transmitting, by the video conference platform and via a second communication channel that is not associated with the video conference, to a server associated with the communication service, the content request to the non-participant, wherein the content request is transmitted to the server using the destination information;
   receiving, by the video conference platform from the server, a response to the content request; and
   transmitting, by the video conference platform via the first communication channel, to at least one of the first participant or a second participant of the video conference, a message reflecting the response.

2. The method of claim 1, further comprising:
   causing the message reflecting the response to be displayed, to one or more participants of the video conference, in a video conference interface.

3. The method of claim 1, wherein transmitting the content request to the non-participant and receiving the response to the content request is performed by a video conference platform.

4. The method of claim 1, wherein transmitting the content request to the non-participant and receiving the response to the content request is performed by a video conference application.

5. The method of claim 1, wherein the content request comprises an identifier used to identify at least one of an email address, a phone number, or a unique identifier of the non-participant.

6. The method of claim 1, wherein the content request comprises at least one of a text message, a survey, or an audio file.

7. The method of claim 1, wherein the content request is transmitted to multiple non-participants.

8. A system, comprising:
   a memory;
   a processing device operatively coupled to the memory, the processing device configured to:
   present a video conference on a user device of a first participant;
   receive, from the first participant of the video conference, via a first communication channel that is associated with the video conference, a content request directed to a non-participant, wherein the non-participant is not connected to the video conference;
   receive destination information related to a communication service associated with the non-participant;
   transmit, via a second communication channel that is not associated with the video conference, to a server associated with the communication service, the content request to the non-participant, wherein the content request is transmitted to the server using the destination information;

receive, from the server, a response to the content request; and transmit, via the first communication channel, to at least one of the first participant or a second participant of the video conference, a message reflecting the response.

9. The system of claim 8, wherein the processing device is further configured to:

cause the message reflecting the response to be displayed, to one or more participants of the video conference, in a video conference interface.

10. The system of claim 8, wherein transmitting the content request to the non-participant and receiving the response to the content request is performed by a video conference platform.

11. The system of claim 8, wherein transmitting the content request to the non-participant and receiving the response to the content request is performed by a video conference application.

12. The system of claim 8, wherein the content request comprises an identifier used to identify at least one of an email address, a phone number, or a unique identifier of the non-participant.

13. The system of claim 8, wherein the content request comprises at least one of a text message, a survey, or an audio file.

14. The system of claim 8, wherein the content request is transmitted to multiple non-participants.

15. A non-transitory machine-readable storage medium storing executable instructions that, when executed by a processing device, cause the processing device to:

present a video conference on a user device of a first participant;

receive, from the first participant of the video conference, via a first communication channel that is associated with the video conference, a content request directed to a non-participant, wherein the non-participant is not connected to the video conference;

receive destination information related to a communication service associated with the non-participant;

transmit, via a second communication channel that is not associated with the video conference, to a server associated with the communication service, the content request to the non-participant, wherein the content request is transmitted to the server using the destination information;

receive, from the server, a response to the content request; and transmit, via the first communication channel, to at least one of the first participant or a second participant of the video conference, a message reflecting the response.

16. The non-transitory machine-readable storage medium of claim 15, further comprising executable instructions that, when executed by the processing device, cause the processing device to:

cause the message reflecting the response to be displayed, to one or more participants of the video conference, in a video conference interface.

17. The non-transitory machine-readable storage medium of claim 15, wherein transmitting the content request to the non-participant and receiving the response to the content request is performed by a video conference platform.

18. The non-transitory machine-readable storage medium of claim 15, wherein:

wherein transmitting the content request to the non-participant and receiving the response to the content request is performed by a video conference application.

19. The non-transitory machine-readable storage medium of claim 15, wherein the content request comprises an identifier used to identify at least one of an email address, a phone number, or a unique identifier of the non-participant.

20. The non-transitory machine-readable storage medium of claim 15, wherein the content request is transmitted to multiple non-participants.

\* \* \* \* \*